Figure 1:
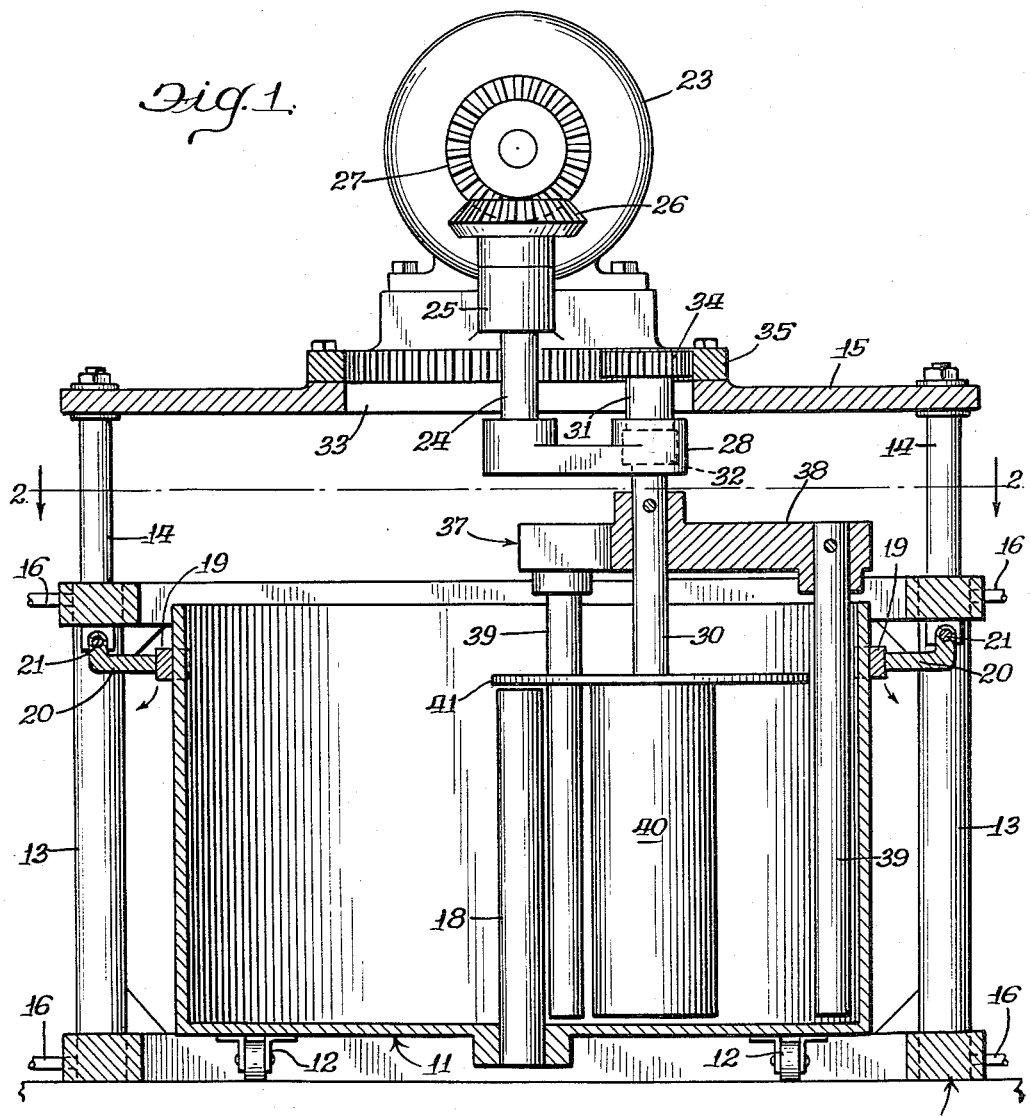

Feb. 16, 1965 D. W. ENOCH 3,169,493
APPARATUS FOR PROCESSING DOUGH
Filed July 25, 1962

INVENTOR.
Duard W. Enoch
BY
Darbo, Robertson &
Vandenburgh Attys.

United States Patent Office 3,169,493
Patented Feb. 16, 1965

3,169,493
APPARATUS FOR PROCESSING DOUGH
Duard W. Enoch, Kansas City, Mo., assignor to Interstate Bakeries Corporation, Kansas City, Mo., a corporation of Delaware
Filed July 25, 1962, Ser. No. 212,212
10 Claims. (Cl. 107—36)

The present invention relates to an apparatus for mixing bakery dough or the like.

Several co-inventors and I previously have devised a novel apparatus for use in working flour doughs, particularly for testing the characteristics of various flours and other ingredients that may be used in such doughs. This apparatus is the subject of a United States patent application, Serial No. 199,182, filed May 31, 1962 and entitled Rheological Testing Means and Method of Testing Wheat Flours, the disclosure of which is incorporated herein by reference. Embodiments of the apparatus employed for testing purposes have a relatively small mixing bowl as illustrated by the fact that the amount of flour employed in making the doughs for the tests is in the neighborhood of 700 grams.

The structure of the testing apparatus is such that the dough is worked in a manner different than that which generally takes place in the mixing apparatus employed in much of the commercial baking operations. A dough ball can be worked in a fashion which is extremely effective in the working of the gluten of the flour. It can carry gluten development to any point up through that of maximum development and to gluten fatigue, if desired, most efficaciously. As a result, consideration has been given to the use of a similar mixing apparatus in the mixing or working of doughs for commercial baking operations.

For commercial baking operations it obviously is inefficient to mix small quantities of dough. It is necessary that the apparatus at least be capable of working quantities of dough that are many many times the quantity worked in the testing apparatus of the above identified application. One possibility would be merely to scale up the machine of the above identified application using the same relative proportion of parts, but making them sufficiently larger so that the bowl would accommodate the larger quantity of dough.

While at first glance this might seem to be a logical step, upon further consideration, in the light of the operations conventionally carried on in a bakery, it is not practical. The proportions of the bowl are such that to accommodate the larger quantity of dough the bowl would have a depth from top to bottom such that it would not be practical to use. In commercial baking operations it is necessary that the bowl be sufficiently low so that the operating personnel can easily reach over and into it to observe the characteristics of the dough, to add ingredients, to remove dough therefrom, etc. If the bowl height is kept within the limitation thus imposed, the quantity of the dough that the bowl will hold is reduced to an amount impractical for use in most commercial bakeries.

The foregoing dictated that the bowl proportions must be changed such that it is larger in horizontal cross-section to meet the volume considerations and reduced in height for access purposes. However, the mixing apparatus so constructed failed to perform the dough working operation achieved by the testing apparatus and which it was sought to duplicate in the commercial device.

In the testing apparatus, a dough ball is formed. The dough ball becomes entwined on a center post in the mixing bowl and the dough is pulled, stretched and worked by the legs of a spider which alternatively move past the center post and through the dough entwined thereon. In a commercial size apparatus, the dough would not remain entangled with the center post in a manner which would permit the corresponding working of the dough by the moving legs of the spider.

This may have been caused by one of several factors: the increased size and greater movement of the legs away from the center post was greater than the dough could stretch with the result that the dough separated rather than remaining a dough ball; and the changed proportions of the bowl served to provide less confinement of the dough to a working zone. In any event, whatever the reason, the desired working of the dough was not achieved. I discovered that by adding an additional post to the spider, which post was positioned so that it moved merely in a circular path about the center post of the bowl, the desired working action on the dough could be achieved.

Preferably, this added post is relatively large in cross sectional size as compared to the cross sectional size of the bowl center post and the cross sectional size of the legs of the spider. While I am not sure that I fully understand why this added post changes the action of the apparatus on the dough and enables it to achieve the desired working of the dough as in the testing apparatus, it is my belief that this added post serves to hold a dough ball about the center post of the bowl and acts as an intermediate support for the dough that is being stretched between the center post of the bowl and the moving legs.

Figure 2:
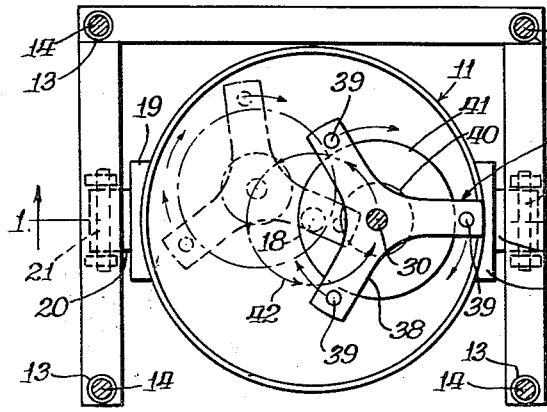

Further objects and advantages will be apparent from the following description taken in conjunction with the drawings in which:

FIGURE 1 is a vertical section at line 1—1, FIGURE 2, through a somewhat diagrammatic illustration of an embodiment of the invention; and FIGURE 2 is a section taken at line 2—2 of FIGURE 1.

Although the following disclosure offered for public dissemination is detailed to ensure adequacy and aid understanding, this is not intended to prejudice that purpose which is to cover each new inventive concept herein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The illustrated embodiment includes a frame generally designated at 10. As viewed in plan, the frame is generally U shaped having one open side so that the bowl generally designated at 11 may be moved into and out of the frame. Bowl 11 is mounted on suitable casters 12 so that it easily may be rolled about on the floor or other supporting surface on which the machine is mounted. At each of the four corners of frame 10 are hydraulic cylinders 13 having pistons 14. A mounting plate 15 is secured to each of pistons 14. Pipes 16 connect cylinders 13 to a suitable hydraulic apparatus (not shown) so that plate 15 and the structure mounted thereon may be raised and lowered with respect to bowl 11.

Bowl 11 has a center post 18 axially mounted therein. Means are provided for holding the bowl in a specific position when the machine is operated. For the purpose of illustration, this means is shown as clamps 19 having arms 20 which are pivotally secured to frame 10 by pins 21. To remove the bowl from the machine, clamps 19 are swung down about pivot pins 21. When clamps 19 are fixed in the upper position, illustrated in FIGURE 1, they hold the bowl in the desired specific position.

A power means represented by motor 23 is employed to drive the apparatus through a shaft 24. Shaft 24 is coaxial with center post 18. The shaft is journaled in a bearing 25 supported on mounting plate 15. At its upper end the shaft carries a bevel gear 26 which engages a bevel gear 27 on the output shaft of the power means 23. An arm 28 is secured to the bottom end of shaft 24.

A shaft 30 has an enlarged upper end 31 which rides on a thrust bearing 32 in which shaft 30 is journaled with respect to arm 28. The enlarged end 31 extends into an opening 33 in plate 15 and has a gear 34 affixed to the upper end thereof. Gear 34 engages an internal ring gear 35 attached to plate 15 and coaxial with shaft 24.

A spider generally designated at 37 is secured to shaft 30. Spider 37 comprises a three-armed support member 38 having legs 39 affixed to and extending downwardly from each of the arms adjacent the ends thereof. An axial post 40 is attached to the bottom end of shaft 30. At the top of post 40 a plate 41 is secured thereto. Plate 41 extends over center post 18 immediately thereabove when the spider 37 is in its lowered operating position as illustrated in FIGURE 1.

As power means 23 rotates arm 28 about the axis of center post 18, post 40 will describe a circular path illustrated in FIGURE 2 at 42 about center post 18. The engagement of gear 34 with ring gear 35 rotates shaft 30 about its own axis. Consequently axial post 40 also will be rotating about its own axis as it moves about the axis of center post 18 in path 42.

The rotation of shaft 30 also rotates spider 37 about the axis of the shaft. At the same time of course, spider 37 is moving about the circular path illustrated at 42. The position of legs 39 is such that as they rotate, they will pass on the opposite side of center post 18 from the side at which shaft 30 happens to be. Thus spider 37 has what may be described as an orbital movement about center post 18 with the legs moving in paths about and intercalated with the center post. The speed of rotation of the spider about the axis of shaft 30 should be at least one and one-half times the speed of rotation about the axis of center post 18. Preferably, it is over twice as fast. The difference in speeds of rotation should be a mixed number to give a "precessed" action.

In use in mixing dough, an amount of dough is put into bowl 11 to fill the bowl to a level substantially below the top of post 18. With power means 23 operating the mixing head as just described, the dough first is worked into a dough ball and the dough ball then is worked by the intercalated movement of the legs with center post 18. There is a constant pulling and stretching of the gluten and the dough ball. However, because of the presence of axial post 40, the dough remains entangled about center post 18 so that the intercalated movement of the legs continually bring each successive leg into and through the dough about the center post. Plate 41 prevents the dough from working upwardly beyond the top of center post 18 where it no longer is pulled and stretched by the movements of legs 39. When the dough has been worked to the desired extent, power means 23 is stopped and plate 15 raised to remove spider 37 and axial post 40 from the dough. After bowl 11 is unclamped from frame 10, it may be wheeled out of the machine.

In the illustrated embodiment, posts 18 and 40 and legs 39 are all cylindrical in configuration. I have found that the most successful operation is achieved if axial post 40 is substantially larger in diameter than is center post 18. However, any central support in the position of axial post 40 demonstrates a remarkable improvement in the mixing operation over that achieved when the spider 37 alone is employed. By way of illustration of the comparative sizes of these in the illustrated embodiment, center post 18 is approximately 3 inches in diameter while axial post 40 is approximately 8 inches in diameter. The space between the periphery of the two is approximately 2 inches. The overall dimensions of the bowl are about 44 inches in diameter and 27 inches in depth. The diameter of the legs 39 approximately corresponds to the diameter of center post 18.

I claim:

1. An apparatus for mixing dough or the like including: a mixing bowl having a first post extending upwardly from the bottom thereof; a second post positioned approximately parallel to said first post and mounted for movement in a path having said first post as an axis; a spider having a plurality of legs extending downwardly into said bowl, said spider being mounted for movement of said legs in paths such that a pair of the legs moves about said first post for intercalation of said first post therebetween; and power means connected to the second post and spider to move the two along said paths.

2. An apparatus for mixing dough or the like including: a mixing bowl having a first post extending upwardly from the bottom thereof; a spider including a support member and a plurality of downwardly extending legs secured to the support member, said spider being mounted for movement of said legs in paths such that a pair of the legs moves about said first post for intercalation of said first post therebetween and with a portion of the member describing an approximately circular path with said first post as an axis; power means connected to the member to so move the spider; and a second post attached to said member and extending downwardly from said portion.

3. An apparatus as set forth in claim 2, including a generally horizontal plate attached to the spider and extending from the second post over the top of the first post.

4. An apparatus for mixing dough or the like including: a mixing bowl having a first post secured thereto with its longitudinal axis approximately vertical; a second post parallel to said first post and in juxtaposition to the first post, said second post having an approximately vertical axis and being mounted for rotation about its vertical axis and simultaneously for rotation about the axis of the first post; a mounting member secured to the second post; and a plurality of legs secured to and extending downwardly from the mounting member, said legs being positioned a distance from the axis of the second post greater than the distance between the axes of the two posts.

5. An apparatus as set forth in claim 4, wherein there are three legs.

6. An apparatus as set forth in claim 4, wherein said posts and legs are cylindrical.

7. An apparatus as set forth in claim 4, including power means connected to the second post to rotate the second post about its own axis at a first rate of speed and to rotate the second post about the axis of the first post at a second, different, rate of speed.

8. An apparatus as set forth in claim 7, wherein said first rate of speed is greater than said second rate of speed.

9. In an apparatus for mixing dough or the like having a mixing bowl with a first post extending upwardly from the bottom thereof, a spider including a support member and a plurality of downwardly extending legs secured to the support member, said spider being mounted for movement of said legs in paths such that a pair of the legs moves about said first post for intercalation of said first post therebetween, and with a portion of the member describing an approximately circular path with said first post as an axis, and power means connected to the member to so move the spider, the improvement comprising: a second post attached to said member, extending downwardly therefrom and positioned between said legs.

10. In an apparatus as set forth in claim 9, wherein the cross-sectional size of the second post is greater than that of any of the first post and the legs.

References Cited by the Examiner

UNITED STATES PATENTS

| 52,518 | 2/66 | Blasse | 259—102 |
|---|---|---|---|
| 1,039,192 | 9/12 | Prindle | 259—102 |
| 2,115,742 | 5/38 | Newton | 259—102 |
| 2,184,225 | 12/39 | McDuffee et al. | 259—108 |
| 3,046,812 | 7/62 | Beaman | 259—102 X |

FOREIGN PATENTS 344,764  11/21  Germany.

ROBERT E. PULFREY, Primary Examiner.

J. D. BEIN, CHARLES A. WILLMUTH, Examiners.